(12) United States Patent
Ouchi

(10) Patent No.: US 7,751,094 B2
(45) Date of Patent: Jul. 6, 2010

(54) IMAGE READING APPARATUS AND IMAGE FORMING MACHINE PROVIDED WITH THE SAME

(75) Inventor: Kei Ouchi, Osaka (JP)

(73) Assignee: Kyocera Mita Corporation (JP)

( * ) Notice: Subject to any disclaimer, the term of this patent is extended or adjusted under 35 U.S.C. 154(b) by 854 days.

(21) Appl. No.: 11/649,408

(22) Filed: Jan. 4, 2007

(65) Prior Publication Data
US 2007/0171486 A1 Jul. 26, 2007

(30) Foreign Application Priority Data
Jan. 24, 2006 (JP) ............... 2006-015568

(51) Int. Cl.
H04N 1/46 (2006.01)
H04N 1/04 (2006.01)

(52) U.S. Cl. .............. 358/474; 358/475; 358/509

(58) Field of Classification Search .......... 358/474, 358/475, 400, 401, 482, 483, 505, 509, 510, 358/513, 446, 447, 448, 461, 452, 471
See application file for complete search history.

(56) References Cited

U.S. PATENT DOCUMENTS

| | | | | |
|---|---|---|---|---|
| 4,907,091 | A * | 3/1990 | Yoshida et al. | 358/474 |
| 5,060,283 | A * | 10/1991 | Shiraishi | 382/321 |
| 2001/0010578 | A1 * | 8/2001 | Fujimoto | 355/53 |
| 2002/0154284 | A1 * | 10/2002 | Sato | 355/71 |
| 2002/0167689 | A1 | 11/2002 | Yui | |
| 2002/0171827 | A1 * | 11/2002 | van den Engh | 356/317 |
| 2007/0025719 | A1 * | 2/2007 | Kashiwagi | 396/164 |

FOREIGN PATENT DOCUMENTS

| | | |
|---|---|---|
| CN | 1385730 | 12/2002 |
| JP | 6-90328 | 3/1994 |
| JP | 11344663 | * 12/1999 |
| JP | 2003-32438 | 1/2003 |

* cited by examiner

*Primary Examiner*—Jerome Grant, II
(74) *Attorney, Agent, or Firm*—Gerald E. Hespos; Michael J. Porco

(57) ABSTRACT

An image reading apparatus for generating image data corresponding to a document image, includes: an irradiating section for irradiating light rays to an image bearing surface of a document; a housing formed with a slit for restrictedly passing light rays reflected from the image bearing surface of the document; a photoelectric conversion element for converting an optical image made of the light rays having passed through the slit of the housing to an electric signal; and an optical system for guiding the light rays having passed through the slit of the housing to the photoelectric conversion element. The housing has a light restrictor at each of the both ends of the slit. The light restrictor projects toward the image bearing surface of the document to thereby keep light rays reflected from an area outside a reading area of the image bearing surface of the document from entering the slit.

10 Claims, 10 Drawing Sheets

IMAGE READING APPARATUS AND IMAGE FORMING MACHINE PROVIDED WITH THE SAME

BACKGROUND OF THE INVENTION

1. Field of the Invention

The present invention relates to an image reading apparatus which reads an image on a document by converting reflection light rays from an image bearing surface of the document to an electrical signal, and an image forming machine provided with the image forming apparatus.

2. Description of the Related Art

Conventionally, there has been known an image forming machine, such as a copying machine and the like, which is provided with an image reading apparatus or image reader for reading an image on a document by converting reflection light rays from an image bearing surface of the document to an electric signal.

An image reader provided in a copying machine includes a light source for irradiating light rays to a contact glass on which a document is placed, a housing formed with a slit for passing reflection light rays from the contact glass which is irradiated by the light source, a photoelectric conversion element for converting an optical image of the light rays having passed through the slit of the housing to an electric signal. The image reader forms a copy image (data of the read document image) by passing reflection light rays from the contact glass through the slit of the housing, and guiding them to the photoelectric conversion element.

Recently, the size of an image reader is required to be reduced in view of the demand of reducing the installation space for a copying machine in an office and the like. The reduction of the longitudinal size of the housing for the demand requires the size of the slit to have a smaller allowance for reflection light rays from an end edge of the document placed on the contact glass.

In the conventional image reader as mentioned above, reflection light rays L from an area outside an image reading area of a contact glass 8 is reflected on a region in the vicinity of an end portion 275b of a housing 275 which defines an end of a slit 275a, and further reflected on the contact glass 8, finally enters the slit 275a, as shown in FIG. 9. In other words, not only reflection light rays from the image reading area, but also reflection light rays L from the area outside of the image reading area of the contact glass 8 are permitted to come to the photoelectric conversion element. For this reason, it is hard to convert only document information of the image reading area to the electric signal properly. For example, there has been a problem that a flare (a blur of an image) occurs in the vicinity of an end edge of the copy image since a concentration difference becomes greater between the end edge of the copy image and a central portion thereof as approaching the end edge from the central portion, as shown in a concentration graph of FIG. 10.

In order to solve the problem, peripheral members, such as the housing and the like, are coated with black paint to absorb reflection light rays from the area outside the image reading area, and suppress reflection light rays from the area outside the image reading area from entering the slit of the housing, and thus suppress the occurrence of a flare on a copy image (see Japanese Unexamined Patent Publication No. Hei 6-90328, for example.)

The publication of Hei 6-90328 discloses an image reading apparatus in which reflection light rays from a document irradiated by a light source is passed through a slit defined by two plate members arranged opposite to each other at a predetermined space and focused onto a reading sensor by means of a focusing lens. Further, the respective outer surfaces of the two plate members are coated with black paint to thereby form a non-reflective surface to prevent the occurrence of a flare due to undesired reflection light rays from a periphery of the document.

However, in the image reading apparatus disclosed in the Publication of Hei 6-90328, there is a problem of involving an increased number of production processes due to the formation of a black paint layer on the peripheral members.

SUMMARY OF THE INVENTION

It is an object of the present invention to provide an image reading apparatus which can sufficiently prevent a flare from occurring on a copy image without increasing the number of construction parts and production processes, and to provide an image forming machine provided with the same.

According to an aspect of the invention, an image reading apparatus includes: an irradiating section for irradiating light rays to an image bearing surface of a document; a housing formed with a slit for restrictedly passing light rays reflected from the image bearing surface of the document; a photoelectric conversion element for converting an optical image made of the light rays having passed through the slit of the housing to an electric signal; and an optical system for guiding the light rays having passed through the slit of the housing to the photoelectric conversion element. The housing is provided with a light restrictor at each of the both ends of the slit. The light restrictor projecting toward the image bearing surface of the document to thereby keep light rays reflected from an area outside a reading area of the image bearing surface of the document from entering the slit.

According to another aspect of the invention, an image forming machine includes the image reading apparatus; and an image forming portion for forming an image on a recording medium based on image data generated by the image reading apparatus.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS

Figure 1:
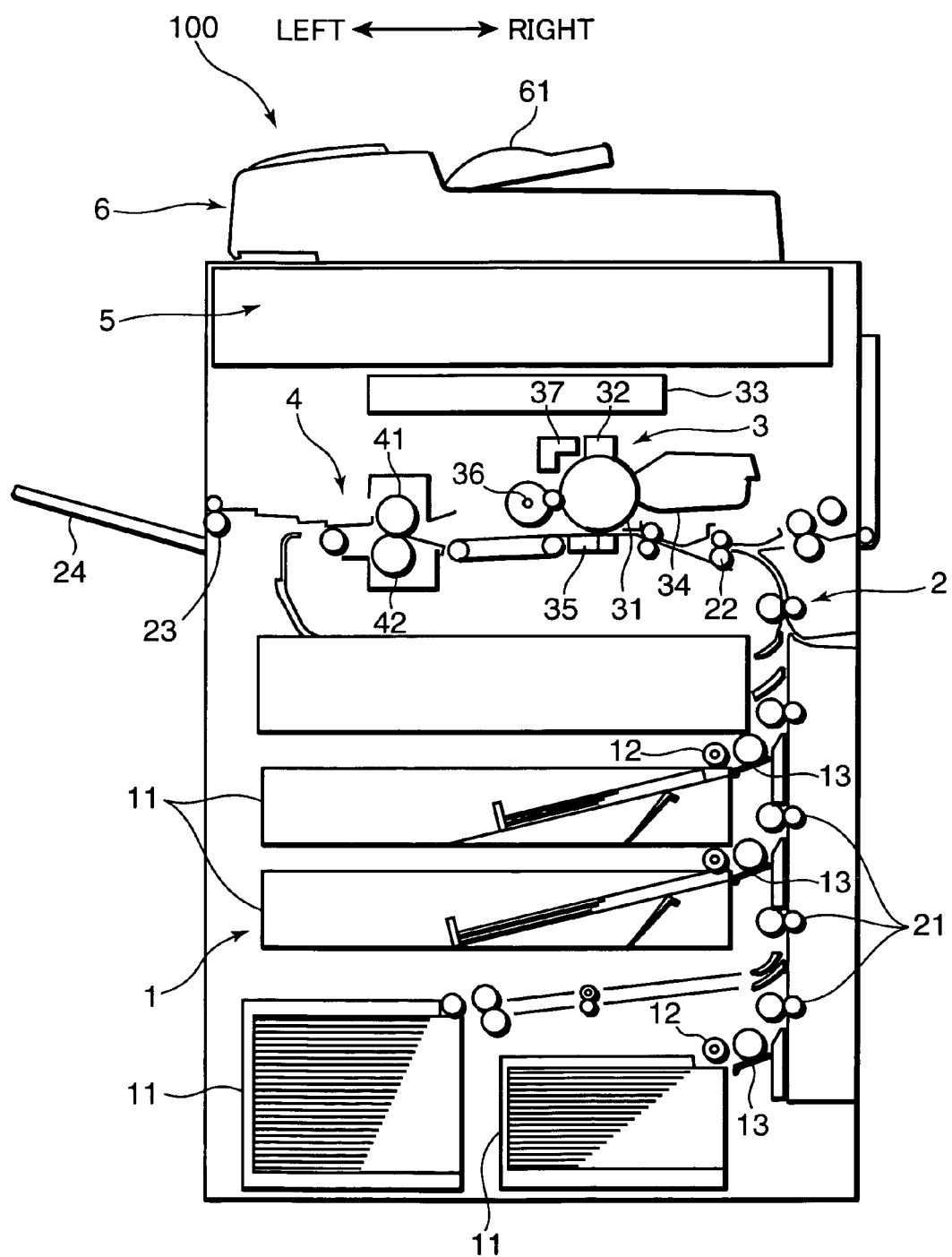
FIG. 1 is a front cross sectional view showing a whole construction of a copying machine according to an embodiment of the present invention.

Hereinafter, an embodiment of the present invention is described referring to the drawings.

Figure 2:
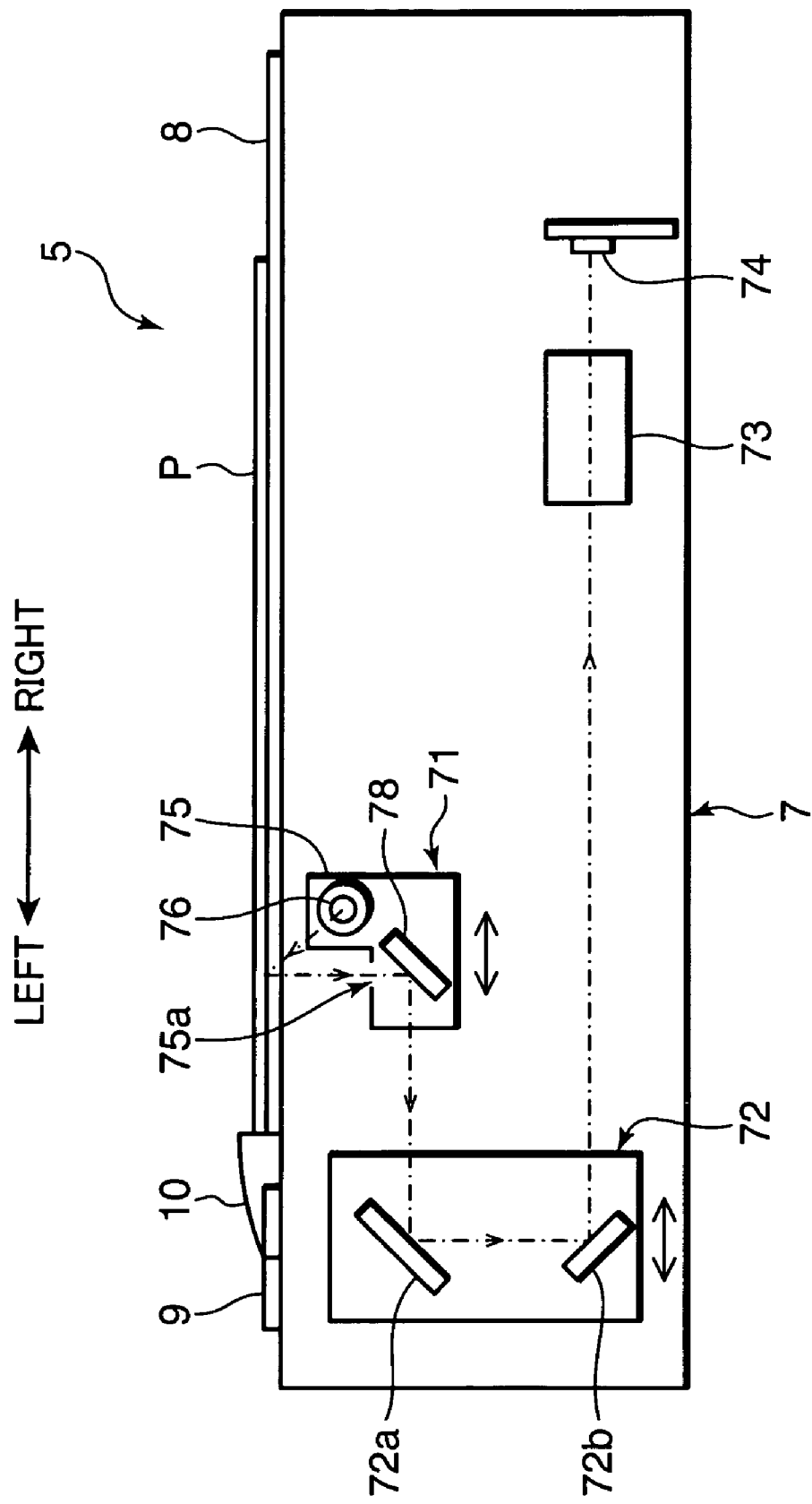
FIG. 2 is a schematic cross sectional view for illustrating a construction of an image reader of the copying machine shown in FIG. 1.
Figure 3:
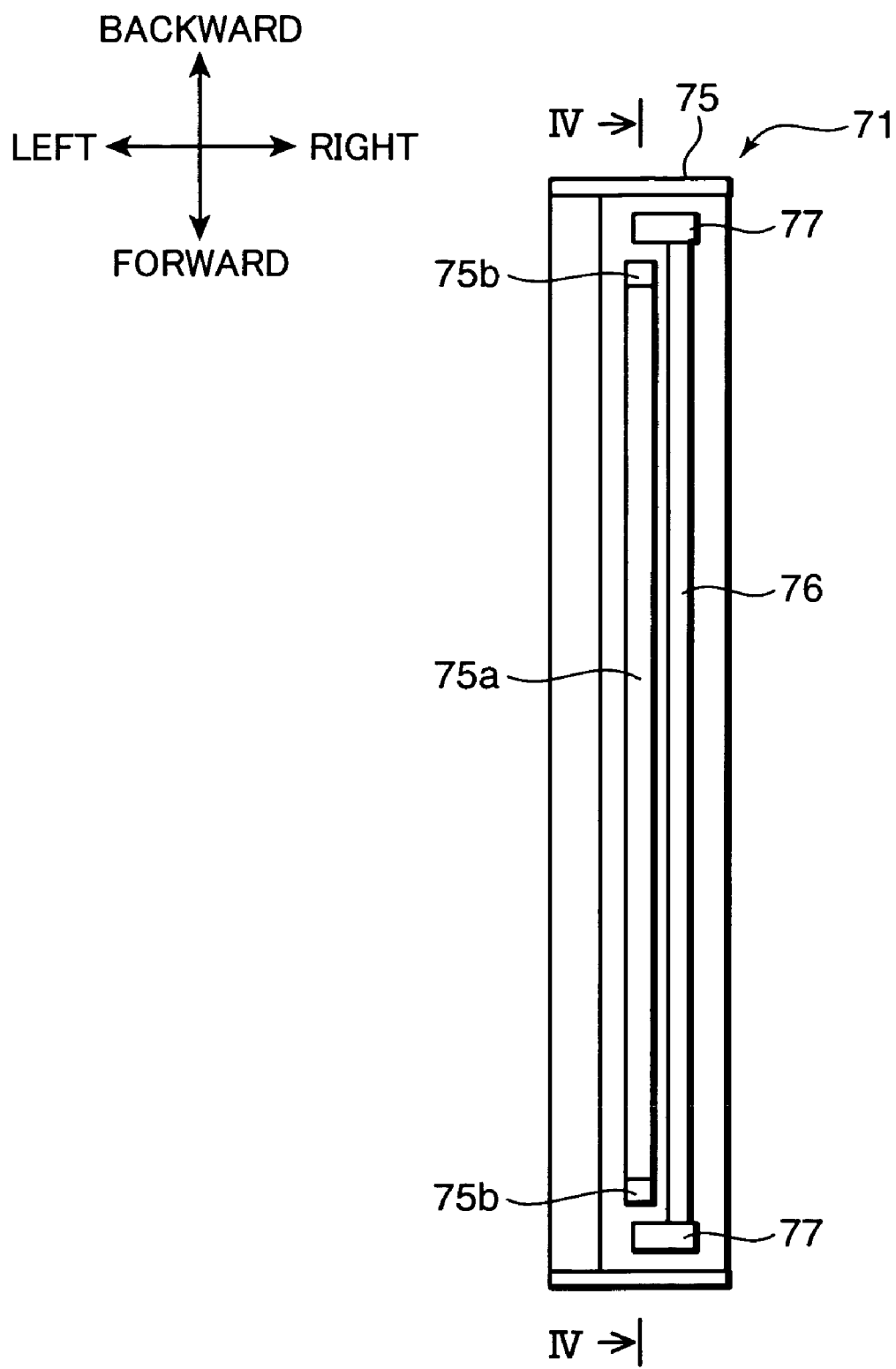
FIG. 3 is a plan view showing a first moving carriage of the image reader shown in FIG. 2.

FIG. 1 is a front sectional view illustrating a general construction of a copying machine according to an embodiment of the present invention. FIG. 2 is a schematic cross-sectional view illustrating a configuration of an image reader of the copying machine shown in FIG. 1. FIGS. 3 through 6 illustrate main configurations of the image reader shown in FIG. 2. First, referring to FIG. 1, the general configuration of the copying machine 100 according to the embodiment of the present invention is described.

As shown in FIG. 1, the copying machine 100 of the present embodiment includes a sheet supplying section 1 provided in a lower portion of a main body, a sheet conveying section 2 provided in an upper right portion of the sheet supplying section 1, an image forming section 3 provided above the sheet conveying section 2, a fixing section 4 provided in a downstream of the image forming section 3 in a sheet conveying direction, an image reader 5 provided above the image forming section 3 and the fixing section 4, and a document feeder 6 (ADF) provided above the image reader 5. The image reader 5 is an example of an image reading apparatus according to the present invention.

In the sheet supplying section 1, a stack of sheets stacked in a sheet supplying cassette 11 which is detachably mounted in the main body is conveyed to an exit (right side in FIG. 1) of the sheet supplying cassette 11 by a rotation of a sheet supplying roller 12 having an arc-shaped external surface, and a sheet is separated from other sheets by a separating section 13 provided in the upper rightmost portion of the each sheet supplying cassette 11. With this arrangement, a sheet is surely conveyed from the sheet supplying section 1 to the sheet conveying section 2 after being separated one by one. In the sheet conveying section 2, the sheet conveyed from the sheet supplying section 1 is conveyed toward the image forming section 3 by pairs of conveying rollers 21 and a pair of registration rollers 22. Further, in the sheet conveying section 2, the sheet on which an image is formed in the image forming section 3 and a fixing section 4 is discharged by a pair of discharging rollers 23 onto a discharge tray 24.

In the image forming section 3, a predetermined toner image is formed on the sheet in an electrophotographic processing. The image forming section 3 includes a photoconductive drum 31 rotatably supported and having a photoconductivity, a charging unit 32, an exposure unit 33, a developing unit 34, a transferring unit 35, a cleaner 36, and a neutralizing unit 37. These units 32 to 37 are mounted around the photoconductive drum 31.

The charging unit 32 includes a charging wire to which a high voltage is applied. A predetermined electric potential is applied to a peripheral surface of the photoconductive drum 31 by a corona discharge from the charging wire. In the exposure unit 33, a laser beam emitted from a laser emitting unit in accordance with image data of a document read by an image reader 5 which will be described later, is irradiated to the photoconductive drum 31 via a polygon mirror and a reflecting mirror so as to selectively attenuate the electric potential on the peripheral surface of the photoconductive drum 31. Thus, an electrostatic latent image is formed on the peripheral surface of the photoconductive drum 31. In the developing unit 34, the electrostatic latent image is developed by toner particles, and a toner image is formed on the peripheral surface of the photoconductive drum 31. The transferring unit 35 is operable to transfer the toner image formed on the peripheral surface of the photoconductive drum 31 onto the sheet. The cleaner 36 is operable to remove remaining toner particles from the peripheral surface of the photoconductive drum 31 after the completion of the transferring process. The neutralizing unit 37 is operable to remove remaining charge from the peripheral surface of the photoconductive drum 31.

In the fixing section 4, the sheet to which the toner image has been transferred in the image forming section 3 is held and heated by a heating roller 41 and a pressing roller 42 so that the toner image is fixed on the sheet.

In the image reader 5, light rays are irradiated to a document which is conveyed by the document feeder 6 so as to be contacted with a second contact glass 9, or to a document P set on a first contact glass 8. Light rays reflected therefrom are converted to an electrical signal and image information of the document P is then read. Consequently, image data corresponding to the document image is produced.

The document feeder 6 has a function of the so-called sheet-through-type reading that in response to an input of an instruction to start copying, documents set on an document tray 61 are automatically conveyed one by one while being contacted with the second contact glass 9 and is discharged onto an unillustrated document discharge tray after the document is scanned.

Further, the document feeder 6 is mounted on the main body, and pivotal at the rear end of the main body to open and close a top surface of the image reader 5. In the copying machine 100 of the present embodiment, the document feeder 6 is lifted up rearward to reveal an upper surface of the first contact glass 8 and allow a document to be set on the upper surface of the first contact glass 8.

Next, a configuration of the document reader 5 is described in detail referring to FIGS. 2 to 6.

As shown in FIG. 2, the document reader 5 includes a scanner 7 for producing image data based on an optically obtained image of a document P, the first contact glass 8 for reading a document placed on an upper surface of the scanner 7, and the second contact glass 9 for reading a document in the automatic document feeding. Further, a document placement guide 10 for indicating a placement position for a left end of a document P on the first contact glass 8 is provided between the first contact glass 8 and the second contact glass 9.

The scanner 7 includes a first moving carriage 71 provided in an upper portion of the scanner 7, a second moving carriage 72 mounted on a left side of the first moving carriage 71, an optical lens 73 mounted at an appropriate position in a lower portion of the scanner 7, and an image sensor 74 mounted on a right side of the optical lens 73. The image sensor 74 is an example of a photoelectric conversion element.

The first moving carriage 71 and the second moving carriage 72 are connected to a scanning mechanism which is not shown. The scanning mechanism moves them in a left and right direction at a predetermined speed to scan a whole surface of the document P placed on the first contact glass 8 to thereby read the image information on the whole surface of the document.

The first moving carriage 71 includes a housing 75 connected to the scanning mechanism, a light source 76, such as an exposure lamp, for irradiating light rays to the document P placed on the first contact glass 8 (see FIG. 4), a pair of supporting members 77 mounted on the housing 75 for supporting forward and backward ends of the light source 76 (see FIG. 3), and a reflecting mirror 78 for reflecting the light rays from the first contact glass 8 to the second moving carriage 72. The light source 76 is an example of irradiating means.

Figure 4:
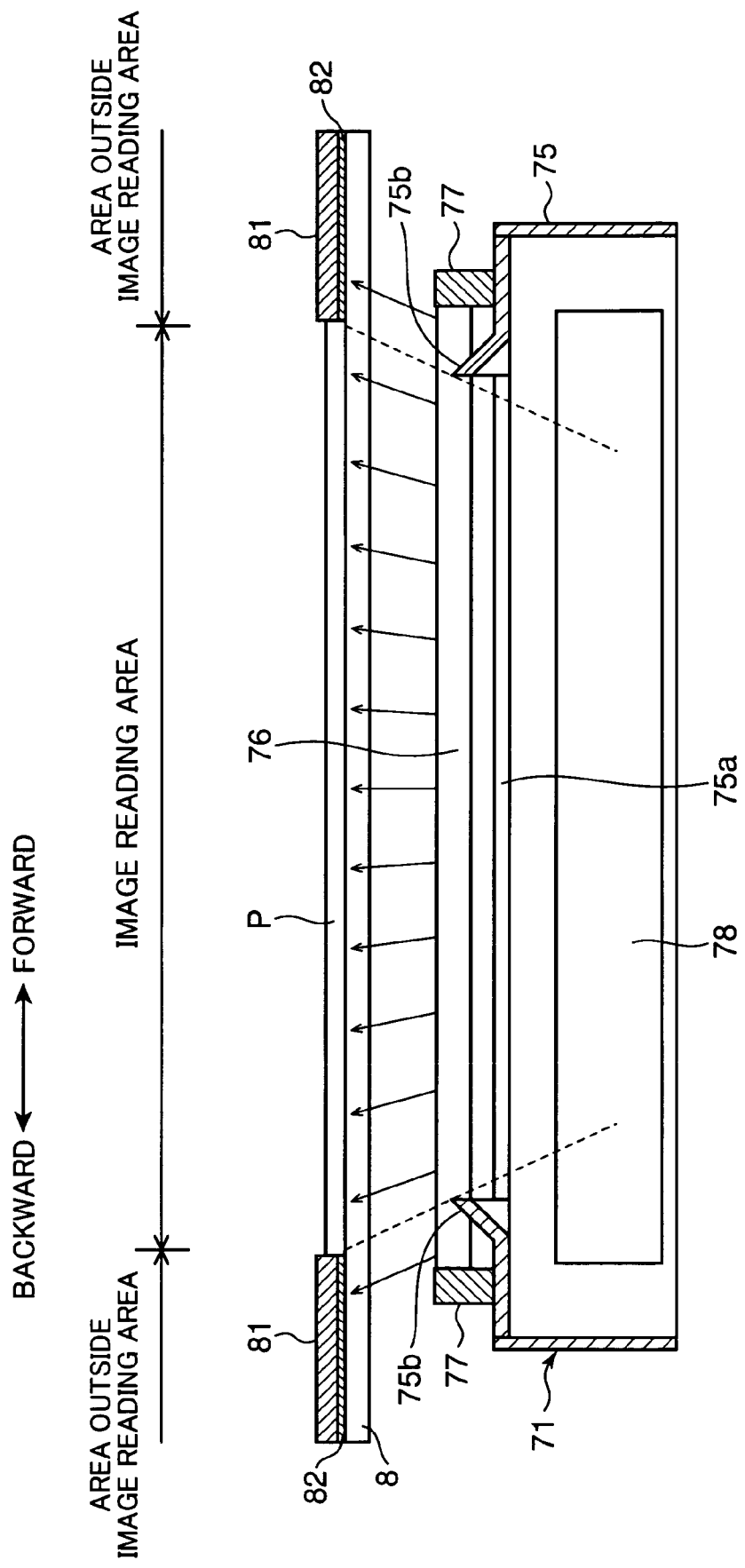
FIG. 4 is a cross sectional view taken along the line IV-IV in FIG. 3.
Figure 5:
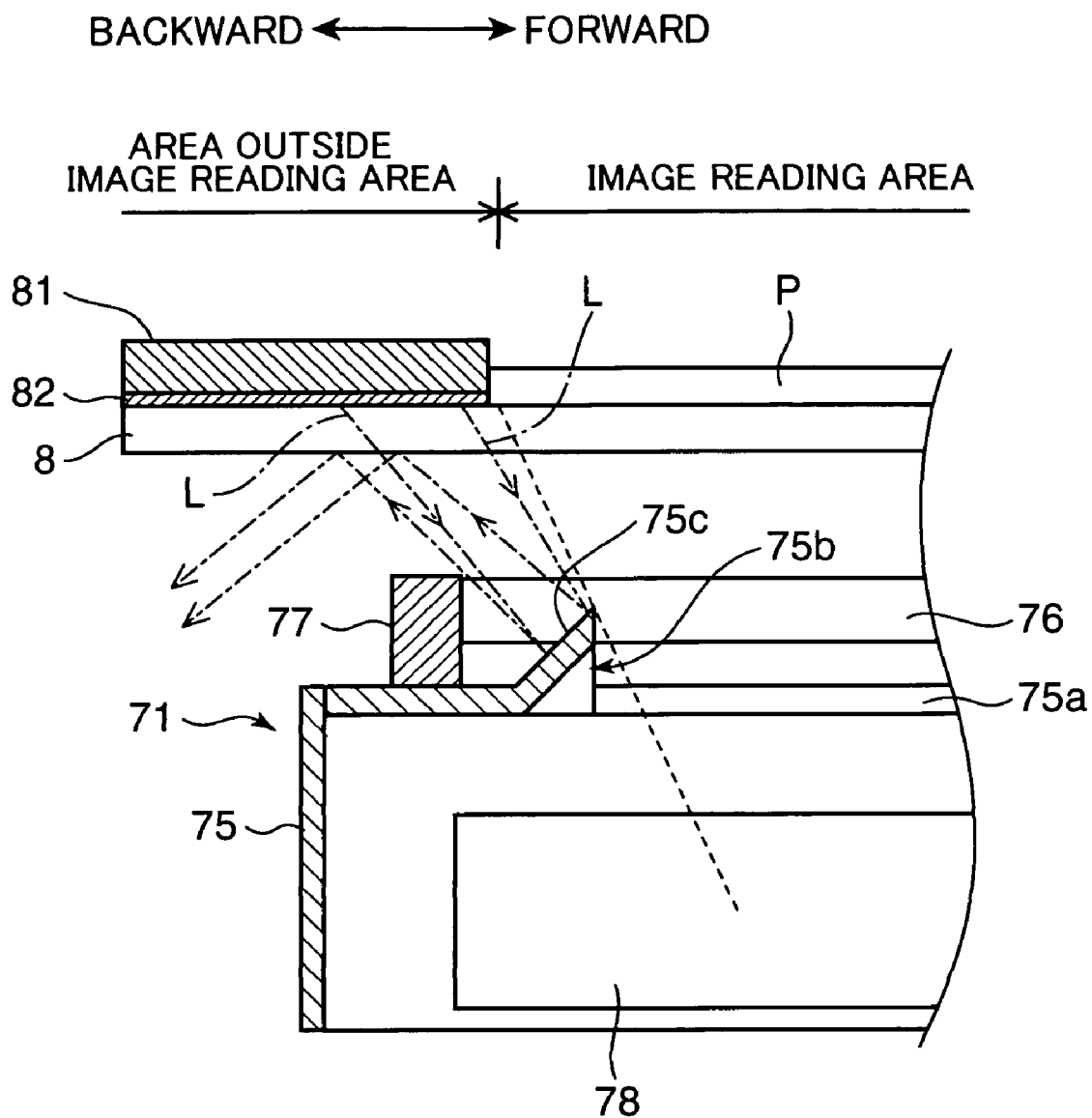
FIG. 5 is an enlarged cross sectional view for illustrating an optical path of reflection light rays at a light restrictor provided in a housing of a first moving carriage shown in FIG. 4.
Figure 6:
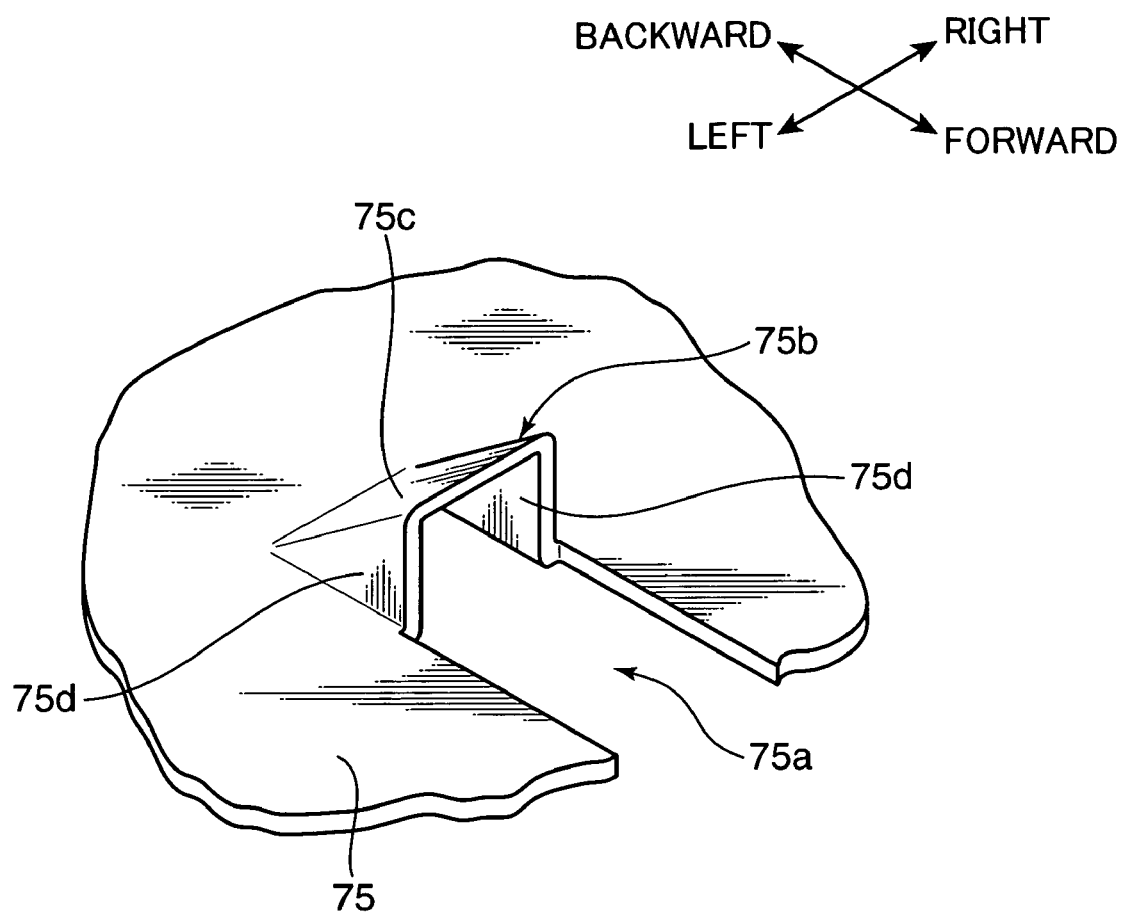
FIG. 6 is a perspective view showing the light restrictor provided in the housing shown in FIG. 5.

As shown in FIGS. 4 and 5, the housing 75 is formed with a long slit 75a in a top wall thereof. The slit 75a extends in the forward and backward direction of the housing 75. The housing 75 further includes a light restrictor 75b at a location which defines each end of the slit 75a.

The light restrictor 75b is formed integrally with the housing 75 by applying a pressing or swaging operation to the location that defines each end of the slit 75a. The light restrictor 75b serves to diffuse reflection light rays L from an area outside an image reading area of the first contact glass 8 to keep the light rays L from entering the slit 75a. The light restrictor 75b includes a diffusing portion 75c rising toward the first contact glass 8 as advancing toward a center of the slit 75a, and side wall portions 75d connecting the both right and left ends of the diffusing portion 75c and the housing 75 (see FIG. 6.). The reflection light rays L from the area outside the image reading area includes light rays diffusely reflected from a bottom surface of the image reading outside area of the first contact glass 8, specifically. However, the reflection light rays L mainly includes light rays diffusely reflected from a bottom surface of members arranged on the area outside the image reading area. Members which are placed on the top surface of the first contact glass 8 includes a document P, a document placement guide 81 which will be described later, or adhesives 82 and the like in the present embodiment. Further, in the present embodiment, the diffusing portion 75c of the light restrictor 75b is so formed to have an inclination angle of about 45° with respect to a main surface of the housing 75.

The second moving carriage 72 includes a pair of reflecting mirrors 72a and 72b half facing each other in a vertical direction to reflecting the light rays from the reflecting mirror 78 of the first moving carriage 71 to the reflecting mirrors 72a and 72b sequentially to guide the reflected light to the optical lens 73.

The optical lens 73 focuses the light rays from the reflecting mirror 72b of the second moving carriage 72 to the image sensor 74.

The image sensor 74 converts an optical image focused by the optical lens 73 to an electric signal. As shown in FIGS. 4 and 5, the document placement guide 81 for indicating the position for the forward and backward ends of the document P set on the first contact glass 8 is mounted on the first contact glass 8 to enable the positioning of a document by coinciding the end of the document P to the document placement guide 81. The document placement guide 81 is adhered on the upper surface of the first contact glass 8 by an adhesive member 82 such as a double-sided adhesive tape. The document placement guide 81 has white color, and the adhesive member 82 has white color or is transparent. Accordingly, the light amount of light rays reflected from the document placement guide 81 or the adhesive member 82 which is irradiated by the light source 76, in other words, the reflection light rays L from the area outside the image reading area is relatively great.

In the image reader 5 as constructed above, the light rays reflected from the first contact glass 8 which is irradiated by the light source 76 is passed through the slit 75a of the housing 75, and light rays are deflected on the reflecting mirror 78, 72a, and 72b sequentially to the image sensor 74 via the optical lens 73, to thereby have a read image of the document P set on the first contact glass 8.

Substantially a whole of the light rays from the image reading area of the first contact glass 8 enter the slit 75a of the housing 75. Meanwhile, the reflection light rays L from the area outside the image reading area of the first contact glass 8 are reflected by the diffusing surface 75c of the light restrictor 75b formed on the housing 75, and consequently go to regions other than the slit 75a.

Figure 7:
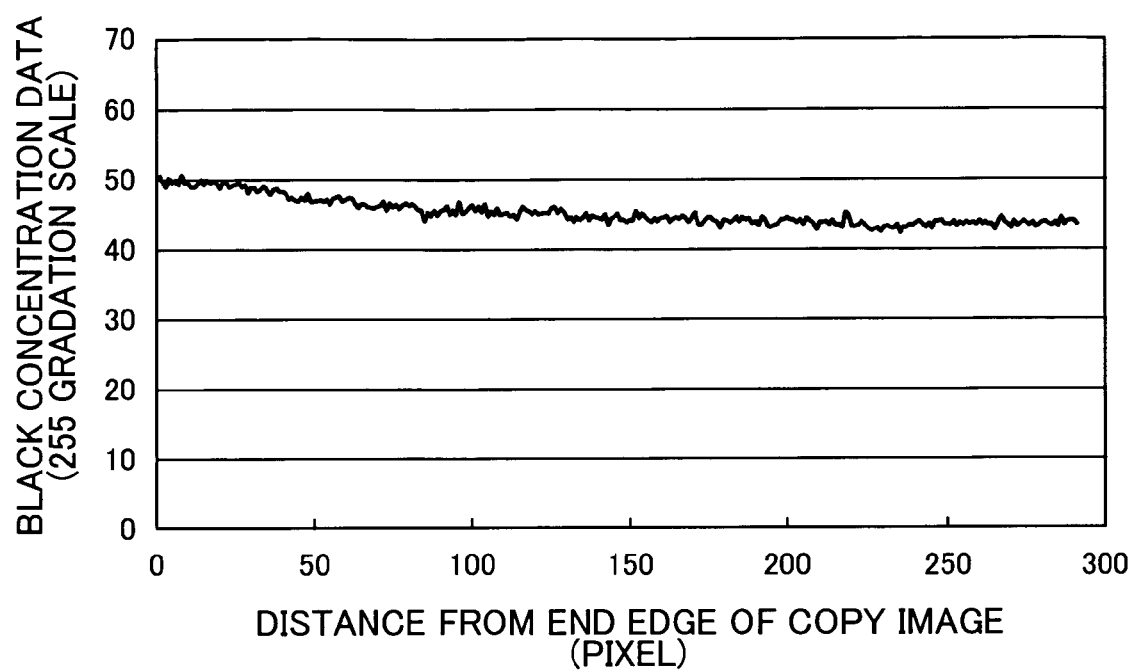
FIG. 7 is a graph showing a black concentration distribution of an end edge of a copy image when the image reader reads a document bearing an image having a uniform black concentration.
Figure 10:
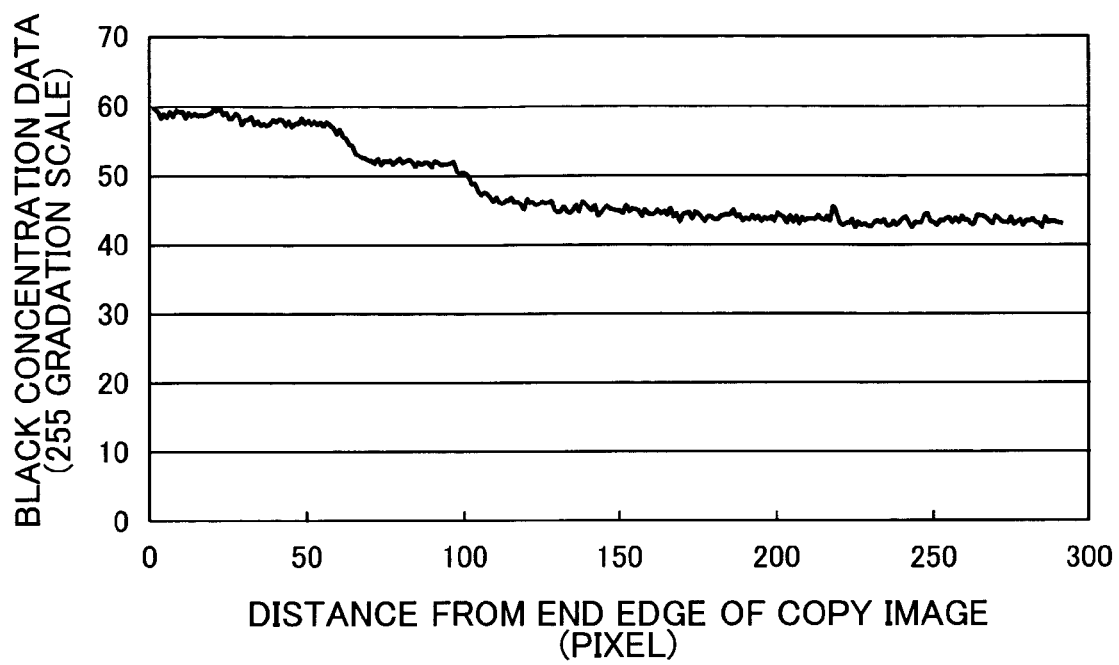
FIG. 10 is a graph showing a black concentration distribution of an end edge of a copy image when a conventional image reader reads a document bearing an image having a uniform black concentration.

FIG. 7 is a graph showing a black concentration distribution of a copy black image when the image reader according to the present embodiment read a document bearing an image having a uniform black concentration and then produced over a copy sheet. The chart shows a black concentration distribution from an end edge of the copy image. In the black concentration values in the vertical axis of the graph shown in FIG. 7, a usually referenced black concentration is regulated substantially at 45 in the 255 gradation scale. Referring to the graph shown in FIG. 7 and the graph in the case of using a conventional image reader (see FIG. 10), a difference between a black concentration at the end portion and a black concentration at a center portion of the copy image produced by the image reader 5 of the present embodiment is much smaller than that of the copy image produced by the conventional image reader. It will be seen that in the copy image produced by the image reader 5 of the present embodiment, the variation of the black concentration at the end portion with respect to the center portion is desirably suppressed.

According to the present embodiment, as mentioned above, the light restrictor 75b is provided at the locations of the housing 75 that define the both ends of the slit 75a to diffuse the reflection light rays L from the area outside the image reading area of the first contact glass 8 to the regions other than the slit 75a. Consequently, the reflection light rays L from the area outside the image reading area are reflected by the light restrictor 75b formed on the housing 75 to be thereby kept from entering the slit 75a. With this arrangement, only the reflection light ray from the image reading area of the first contact glass 8 can be substantively guided to the image sensor 74. Thus, only the information of images falling in the image reading area can be appropriately converted to the electric signal to thereby adequately keep flare from occurring in the vicinity of the end portion of the copy image.

In the present embodiment, as mentioned above, the diffusing portion 75c of the light restrictor 75b rises toward the first contact glass 8 as advancing toward the center of the slit 75a. Accordingly, the reflection light ray from the first contact glass 8 is reflected on the diffusing portion 75c of the light restrictor 75b so that the reflection light rays can be kept off from the slit 75a. Thus, the reflection light rays L from the area outside of the image reading area of the first contact glass 8 can be easily diffused to the regions other than the slit 75a.

Further, the light restrictor 75b is formed by applying pressing or swaging the portions of the housing 75 in the vicinity of ends of the slit 75a to rise toward the first contact glass 8, and is consequently formed with the side walls 75d to keep the reflection light rays L from the area outside the reading area from going into the slit 75a from the sides of the light restrictor 75b. Further, the light restrictor 75b is formed by applying pressing or swaging. Accordingly, the light restrictor 75b can be integrally formed with the housing 75, consequently restrain the number of parts from rising.

In the present embodiment, as mentioned above, the image reader 5 capable of keeping the flare from occurring on the copy image adequately is used, which thus enables images having the high-quality to be easily formed on a sheet.

The embodiment disclosed in this specification should be recognized as examples in all respects, not the limited ones. The scope of the inventions is shown not by the description of the foregoing embodiment but by the scope of the claims, and includes the meanings equal to the scope of the claims and the all modifications within the scope.

For example, in the foregoing embodiment, the image reader 5 provided in the copying machine 100 is described as an example. However, the present invention is not limited to this example, but can be adapted as an image reader to be provided in an image forming apparatus, such as a printer, a facsimile machine, or a composite machine, other than a copying machine.

Figure 8:
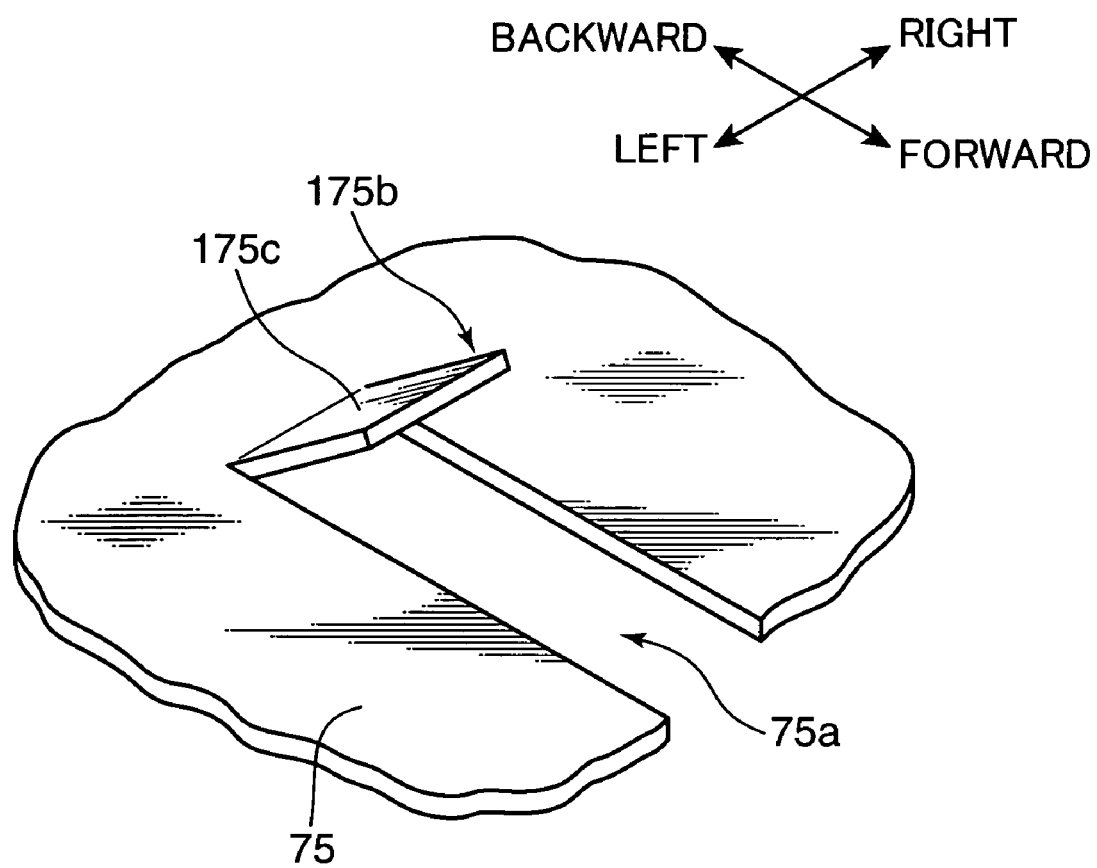
FIG. 8 is a perspective view showing a light restrictor provided in a modified housing.
Figure 9:
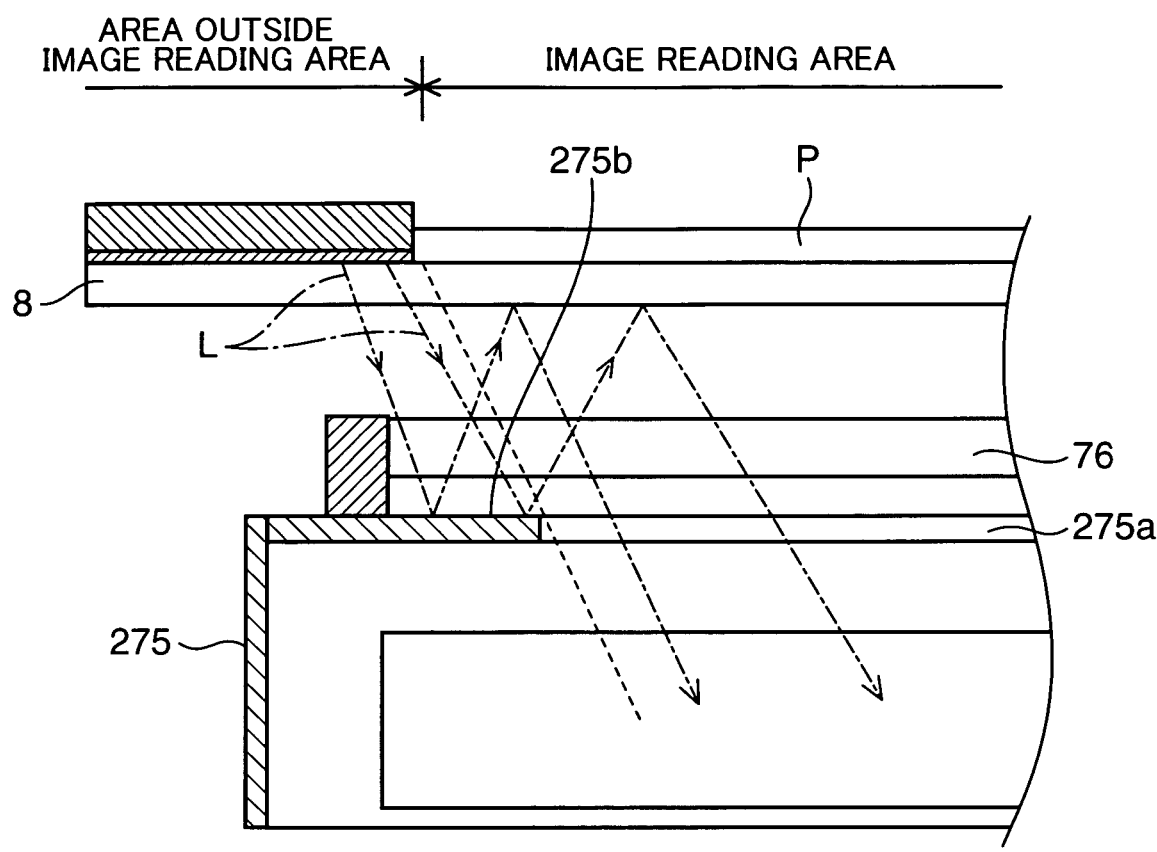
FIG. 9 is a cross sectional view for illustrating an optical path of reflection light rays in the vicinity of an end portion of a housing according to prior art.

In the foregoing embodiment, the light restrictor 75b is formed in such a manner that the pressing or swaging is applied to the portions of the housing 75 that respectively define the ends of the slit 75a to raise the portions toward the first contact glass 8 integrally with the housing 75. However, the present invention is not limited to this. As shown in FIG. 8, a light restrictor 175b may be integrally formed with the housing 75 by cutting and pressing out the portions of the housing 75 that respectively define the ends of the slit 75a to raise toward the first contact glass. With the light restrictor 75b formed as above, the inclination angle of the diffusing portion 175c rising toward the first contact glass as advancing toward the center of the slit 75a with respect to a main surface of the housing 75 can be easily made larger. The diffusing surface 175c of the light restrictor 175b can be easily formed concavely. Therefore, the reflection light rays from the area outside the image reading area of the first contact glass are reflected by the diffusing surface 175c, and can be kept off from the slit 75a.

The light restrictor 75b may be formed by joining another member to the ends portion of the housing 75 by a weld, or fixed by a connecting member. This prevents a metal mold (or a press) for the diffusing portions slit 75a from having a complicated configuration. Thus, it becomes possible to reduce the costs required for such a metal mold.

As described above, an image reading apparatus for generating image data corresponding to a document image, includes: an irradiating section for irradiating light rays to an image bearing surface of a document; a housing formed with a slit for restrictedly passing light rays reflected from the image bearing surface of the document; a photoelectric conversion element for converting an optical image made of the light rays having passed through the slit of the housing to an electric signal; and an optical system for guiding the light rays having passed through the slit of the housing to the photoelectric conversion element, wherein the housing is provided with a light restrictor at each of the both ends of the slit, and the light restrictor projects toward the image bearing surface of the document to thereby keep light rays reflected from an area outside a reading area of the image bearing surface of the document from entering the slit.

With these arrangements, the housing is provided with the light restrictor at a location which defines each end of the slit to diffuse reflection light rays from the area outside the image reading area of the image bearing surface to an area other than the slit. Thus, the reflection light rays from the area outside the image reading area are reflected on the light restrictor to thereby prevent such reflection light rays from entering the slit. Accordingly, only the reflection light rays from the image reading area of the image bearing surface can be substantively guided to the photoelectric conversion element. Thus, only the document information of the image reading area is appropriately converted to an electric signal to thereby sufficiently keep a flare (a blur of an image) from occurring in the vicinity of an end edge of the copy image. It should be noted that the reflection light rays from the area outside the image reading area of the image bearing surface of a document are mainly light rays which are diffusely reflected on the area outside the image reading area of the image bearing surface of the document among the light rays generated by the irradiating section.

Preferably, the light restrictor may include a diffusing surface rising toward the image bearing surface of the document as advancing toward a center of the slit.

Further, the light restrictor may be formed by applying a pressing operation to the specified part of the housing that is in the vicinity of each end of the slit.

Further, the light restrictor may be formed by applying a cut and press-out operation to the specified part of the housing that is in the vicinity of each end of the slit.

Further, the housing may be movable to read the whole image bearing surface of the document. The housing may carry at least: a light source serving as the irradiating section; and a reflecting mirror for changing a traveling direction of the reflected light which has passed through the slit.

This application is based on Japanese Patent Application No. 2006-015568 filed on Jan. 24, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus for generating image data corresponding to a document image, comprising:
    an irradiating section for irradiating light rays to an image bearing surface of a document;
    a housing formed with a slit for restrictedly passing light rays reflected from the image bearing surface of the document;
    a photoelectric conversion element for converting an optical image made of the light rays having passed through the slit of the housing to an electric signal; and
    an optical system for guiding the light rays having passed through the slit of the housing to the photoelectric conversion element,
    wherein the housing is provided with a light restrictor at each of the both ends of the slit, the light restrictor projecting toward the image bearing surface of the document to thereby keep light rays reflected from an area outside a reading area of the image bearing surface of the document from entering the slit.

2. An image reading apparatus according to claim 1, wherein the light restrictor includes a diffusing surface rising toward the image bearing surface of the document as advancing toward a center of the slit.

3. An image reading apparatus according to claim 1, wherein the light restrictor is formed by applying a pressing operation to the specified part of the housing that is in the vicinity of each end of the slit.

4. An image reading apparatus according to claim 1, wherein the light restrictor is formed by applying a cut and press-out operation to the specified part of the housing that is in the vicinity of each end of the slit.

5. An image reading apparatus according to claim 1, wherein the housing is movable to read the whole image bearing surface of the document, the housing carries at least:
    a light source serving as the irradiating section; and,
    a reflecting mirror for changing a traveling direction of the reflected light which has passed through the slit.

6. An image forming machine comprising:
an image reading apparatus for generating image data corresponding to a document image; and,
a main body for forming an image on a recording medium based on the image data,
wherein the image reading apparatus including:
an irradiating section for irradiating light rays to an image bearing surface of a document;
a housing formed with a slit for restrictedly passing light rays reflected from the image bearing surface of the document;
a photoelectric conversion element for converting an optical image made of the light rays having passed through the slit of the housing to an electric signal; and,
an optical system for guiding the light rays having passed through the slit of the housing to the photoelectric conversion element,
wherein the housing is provided with a light restrictor at each of the both ends of the slit, the light restrictor projecting toward the image bearing surface of the document thereby to keep light rays reflected from an area outside a reading area of the image bearing surface of the document from entering the slit.

7. An image forming machine according to claim 6, wherein the light restrictor includes a diffusing surface rising toward the image bearing surface of the document as advancing toward a center of the slit.

8. An image forming machine according to claim 6, wherein the light restrictor is formed by applying a pressing operation to the specified part of the housing that is in the vicinity of each end of the slit.

9. An image forming machine according to claim 6, wherein the light restrictor is formed by applying a cut and press-out operation to the specified part of the housing that is in the vicinity of each end of the slit.

10. An image forming machine according to claim 6, wherein the housing is movable to read the whole image bearing surface of the document, the housing carries at least:
a light source serving as the irradiating section; and,
a reflecting mirror for changing a traveling direction of the reflected light which has passed through the slit.

* * * * *